Aug. 23, 1932.   C. M. WHITFIELD ET AL   1,873,693
CHRISTMAS TREE HOLDER
Filed Feb. 5, 1931
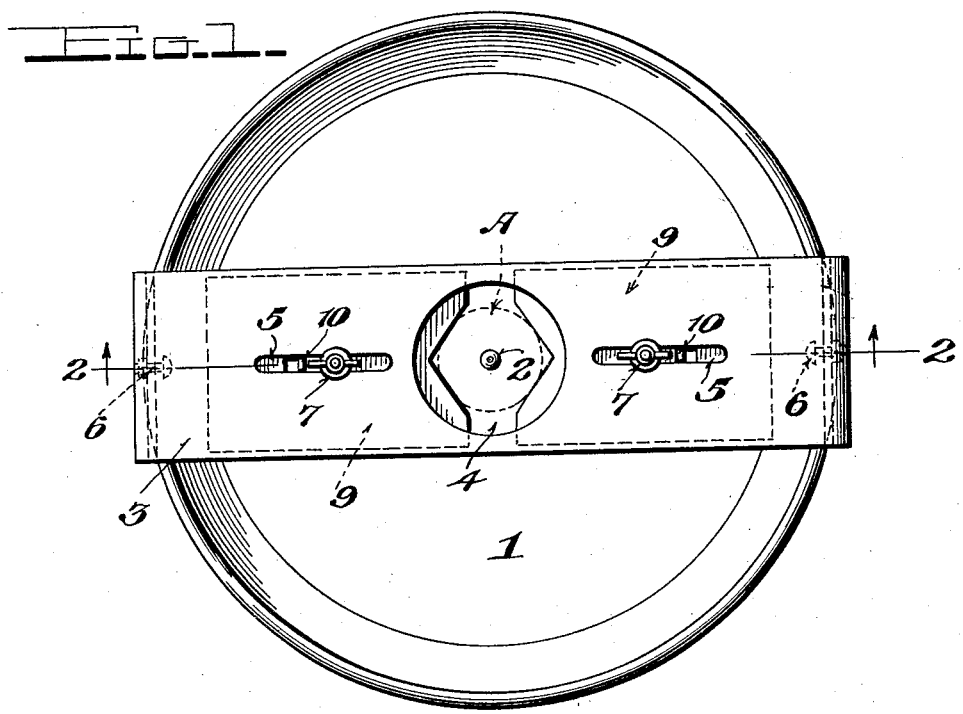
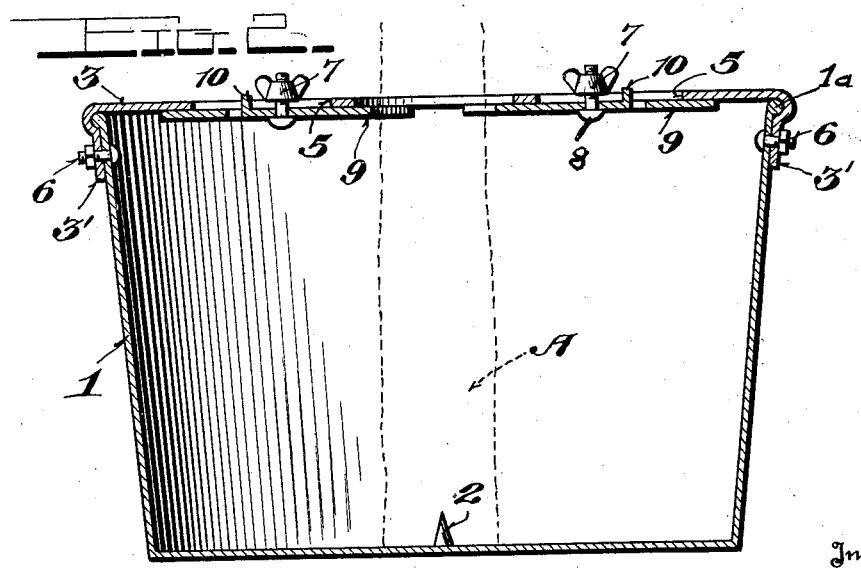
Inventor
C. M. Whitfield
and R. E. Gage
By A. W. Freeman
Attorney Patented Aug. 23, 1932

1,873,693

UNITED STATES PATENT OFFICE

CLIFFORD M. WHITFIELD AND RICHARD C. GAGE, OF SIOUX FALLS, SOUTH DAKOTA

CHRISTMAS TREE HOLDER

Application filed February 5, 1931. Serial No. 513,723.

This invention relates to Christmas tree holders, and has for its primary object to provide a novel holder wherein a Christmas tree may be firmly and securely held upright.

A further object of the invention is to provide a holder which includes a tub, and which holder is capable of being readily dismantled so that the tub may be used for any desired purpose during the time when it is not in use as a holder.

Another object of the invention is to provide a holder of this type which enables ready filling of the tub with water or wet sand to weight same.

A still further object of the invention is to provide a device which is positive in operation, which embodies a minimum of parts; which is inexpensive in construction and which will withstand hard usage due to its inherently simple and rugged nature.

Further objects and advantages will become apparent as the description proceeds, reference being had to the accompanying drawing, in which:

Fig. 1 is a plan view of the invention assembled in operative position; and

Fig. 2 is a section on line 2—2 of Fig. 1.

In proceeding in accordance with the present invention, a tub-like receptacle 1 is provided which may be of any suitable material, size, or shape and in fact of standard manufacture purchasable in the open market. To the center of the base of the receptacle 1 is fastened a sharp conical spike or prong 2 which latter is adapted to hold the butt of a tree when forced down into engagement therewith. At the upper end of the receptacle the usual flanged rim 1a is provided. A base plate 3 of strip-form having a central hole 4, and rectangular slots 5 is fastened to the receptacle by bolts and nuts 6. The plate 3 has downwardly extending extremities 3' which in part have the same conformation as and fit over the rim 1a of the receptacle so that when the two members are engaged as shown, a virtual straight line support is furnished to the plate whereby rocking movements about its longitudinal axis is prevented.

Beneath the plate 3 and slidably fixed thereto by wing nuts 7 and bolts 8, are tree-engaging jaws or plates 9. The plates 9 are provided with notched inner ends that fit about and engage a tree trunk so that the latter will be firmly positioned between the jaws thus provided. While the wing nuts 7 will prevent any longitudinal displacement of the plate 9 when once fixed in their desired position, movement about the bolts as centers might be had. To prevent this, the plates 9 have upwardly struck out lugs 10 on their surfaces which engage in the slots 5 of the plate 3.

In operation, the plate 3 with its appendages, is fixed in position on the receptacle 1 by applying the bolts and nuts 6. The wing nuts 7 are loosened to allow free access to the hole 4 and the tree trunk A is inserted therein, and impaled on spike 2. Plates 9 are then brought into engagement with the tree trunk and clamped by the nuts 7. The receptacle may then be filled with water, sand or any similar substance to add weight to the base to prevent upsetting. It will be noted that a particularly advantageous feature is here displayed namely, that the top of the receptacle is open on each side of the plate for nearly its entire surface permitting water etc. to be readily poured into the tub, thus eliminating any filling through caps or other restricted orifices.

When not in use as a tree holder it will be seen that the receptacle 1 may be separated from the rest of the device by simply detaching the two nuts 6 and may then be used as a bucket by attaching any well known form of wire handle in the holes left by the bolts or it may be put to any use which the owner sees fit.

What is claimed is:

1. In a Christmas tree holder, a cylindrical receptacle, a base plate disposed diametrically across the top of said receptacle, said plate having an opening intermediate its ends to receive the trunk of a tree and having rectangular slots, a pair of plates carried by said base plate and having notched ends to engage with opposite sides of the tree trunk and having struck out lugs engaging in the slots of said base plate to prevent lateral movement of the tree engaging plates, bolts extending through the slots to adjustably connect said plates and bolts to connect said base plate to said receptacle, said base plate being of strip form whereby to leave space on each side thereof for filling of the receptacle with a weighting subtances.

2. In a Christmas tree holder, a cylindrical receptacle, a base plate seated upon and extending diametrically across the top of said receptacle, said plate having an opening intermediate its ends to receive a tree trunk and having elongated slots extending lengthwise of the plate, a pair of tree engaging jaws carried by the plate and having lugs engaging in the slots of the plate to prevent lateral movement of the jaws, bolts extending through the slots and jaws to adjustably connect the jaws to the plate, and means to removably mount the plate on the receptacle.

In testimony whereof we affix our signatures.

CLIFFORD M. WHITFIELD.
RICHARD C. GAGE.